July 15, 1969  C. S. MATTHEWS ET AL  3,455,391

PROCESS FOR HORIZONTALLY FRACTURING SUBTERRANEAN EARTH FORMATIONS

Filed Sept. 12, 1966

INVENTORS:
C. S. MATTHEWS
P. VAN MEURS
C. W. VOLEK

BY: J. H. McCarthy

THEIR AGENT

United States Patent Office 3,455,391
Patented July 15, 1969

3,455,391
PROCESS FOR HORIZONTALLY FRACTURING SUBTERRANEAN EARTH FORMATIONS
Charles S. Matthews, Westport, Conn., and Pieter Van Meurs and Charles W. Volek, Houston, Tex., assignors to Shell Oil Company, New York, N.Y., a corporation of Delaware
Filed Sept. 12, 1966, Ser. No. 578,533
Int. Cl. E21b 21/00
U.S. Cl. 166—303                                 7 Claims

ABSTRACT OF THE DISCLOSURE

A process for horizontally fracturing an earth formation that tends to fracture vertically by injecting hot fluid at high pressure until vertical fractures form and have been closed due to thermal expansion of earth formation and then injecting fluid at a pressure sufficient to form horizontal fractures.

---

Figure 1:
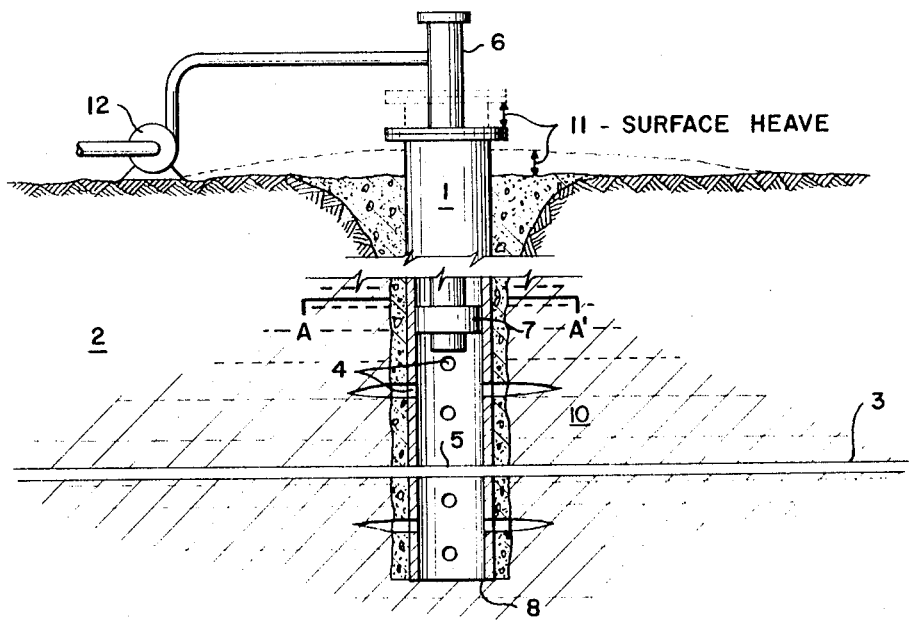

This invention relates to fracturing a subsurface earth formation. More particularly, it relates to a process for thermally controlling a hydraulic fracturing of an earth formation in order to cause the formation of a horizontal fracture in an earth formation in which a vertical fracture is formed at the earth formation temperature.

In practicing the present invention, a horizontal fracture is formed in an earth formation while it is heated to a temperature that controls the direction of the fracture. Our copending patent application S.N. 578,244, filed Sept. 9, 1966, which has matured as U.S. Patent 3,377,250 on Apr. 23, 1968, describes a particularly suitable procedure for heating an earth formation to a selected temperature by transferring heat through walls of a horizontal fracture within the formation.

Hydraulic fracturing is a conventional procedure that is often employed where the permeability of an earth formation is too low to permit fluid to flow into or out of the formation at a rate which is economically suitable in respect to a recovery of petroleum or other material from the earth formation. In a hydraulic fracturing operation, a fluid is confined in a region in which it is in contact with a subterranean earth formation and the pressure on the fluid is increased until a fracture is formed within the earth formation. In a conventional fracturing procedure, the temperature of the fracturing fluid is substantially the same as that of the earth formation.

It is generally recognized that hydraulic fractures form along planes which are perpendicular to the least one of the three principal compressive stresses, that exist along a vertical and two mutually perpendicular horizontal axes, within any subterranean earth formation. Where the vertical stress is least, hydraulic fracturing produces a horizontal fracture. In such a situation, the fracturing occurs when the pressure applied to the fracturing fluid exceeds a pressure that is equivalent to the weight of the overlying earth formations by an amount sufficient to overcome the tensile and/or shear strength of the earth formation, or rock.

The pressure which is equivalent to the weight of the overlying earth formations is commonly referred to as the overburden pressure. It is generally equal to, or slightly less than, about 1 pound per square inch per foot of depth. The pressure required to cause a failure of a subsurface earth formation in situ is commonly referred to as the fracturing pressure or formation breakdown pressure.

In respect to a horizontal fracture, the fracturing pressure is necessarily greater than the overburden pressure, since the overburden must be lifted in order to separate the layers of rock. In respect to a vertical fracture, the vertical comrpessive stress is greater than one or both of the compressive stresses that are perpendicular to each other within the horizontal plane. In the latter type of situation, the hydraulic fractures are vertical, and are oriented in a plane perpendicular to the weaker of the two horizontal compressive stresses. The vertical stress often exceeds both of the horizontal stresses and, in such situations, vertical fractures will form along directions perpendicular to each of the horizontal stresses at fracturing pressures which are less than the overburden pressure.

Where a fracture is to be used in an oil-producing or fluid-mining operation, it is generally advantageous to use a horizontal fracture. A horizontal fracture is better than a vertical fracture in respect to both the distributing of fluid over a region having a significant areal extent, and the interconnecting of a pair of wells. However, it has proven to be difficult to overcome the fracturing tendencies that are dictated by the regional tectonics and in many, if not most, of the reservoirs in the United States the least principal stress is horizontal. In such reservoirs, in order to form a horizontal fracture, it is necessary to either increase the horizontal compressive stresses or decrease the vertical compressive stress, or do both, until the vertical stress becomes the least of the three principal stresses.

Since a confined material can be stressed by heat, the state of stress that exists in the rocks within a subterranean region can be changed by heating a subterranean zone of the appropriate size and shape. When a subterranean earth formation is heated it tends to expand in all directions. If, for example, a ring of closely spaced wells is heated until sufficient heat was transferred to the rocks within the ring, the thermally induced expansions of the rocks increase the horizontal compressive stresses within the rocks. In the heated rocks, the thermally induced horizontal stresses remain unrelieved, because the horizontal expansion of one portion are opposed by the horizontal expansion and (or) incompressibility of the surrounding portions of the rock. On the other hand, the thermally induced vertical stresses are relieved, since the vertical expansion causes a lifting of the overburden. In respect to heated rocks encountered by a well located within the ring of heated wells, the vertical compressive stress becomes the least compressive stress and, in those rocks, a hydraulically induced fracture forms a horizontal fracture.

Tests have been made that indicate or are representative of the thermal stress distribution, which can be produced by heating the wall of a well. Such a stress distribution is analogous to that which is produced within a long cylinder when it is heated along its axis. Although some increases occur in radial compressive stresses, the heating increases the annular stress components only in a localized area around the axis, and it also increases the vertical stress near the axis. Thus, in a well heating operation in which the heating fluid is confined within a borehole, the heating does not enhance the tendency for a hydraulic fracture to be a horizontal fracture.

It has been discovered that by causing a fracture to conduct heat away from the well, it is feasible to thermally stress the subsurface earth formation around a well and convert the earth formation from one which tends to form a vertical fracture to one which tends to form a horizontal fracture. In such an operation, the initial fracture, which is preferably formed at the earth formation temperature, is a vertical fracture. By correlating the rates at which liquid is heated and flowed into the initial fracture, heat is conveyed for a significant distance away from the well, along the directions along which the vertical fracture is most extensive. The heating causes an expansion of the walls of the fracture. The expanding walls move toward each other and close the fracture. When the fracture has closed, the rocks are left with unrelieved components of thermally induced horizontal stress. As the fracture becomes closed, the pressure required to cause fluid to flow into the rocks becomes higher and, when a second fracturing pressure is reached, another fracture is formed. Such a second fracture is apt to be another vertical fracture, and one that forms in a direction perpendicular to the first fracture at a pressure which is less than the overburden pressure. By continuing the heating and flowing of liquid, the above sequence of events is repeated and the injection pressure is further increased. After vertical fractures have formed and have been thermally closed along two directions, the pressure required to inject a liquid, generally exceeds the overburden pressure. When this occurs, any fracture that is formed is likely to be a horizontal fracture.

In general, the present invention is practiced by pumping liquid into a fracture within a subsurface earth formation while heating the inflowing liquid at preferably a surface location and maintaining a flow rate that is adequate for transporting heat from the heating location to the fracture. The flow rate and the rate at which the inflowing liquid is heated to temperatures preferably increasingly greater than the earth formation temperature are correlated so that the liquid remains hotter than the fracture walls until the liquid has moved a significant distance away from the well. The pressure at which the liquid is injected is increased as required in order to maintain an adequate rate of flow. The heating and pumping of the liquid are continued until the pressure at which the liquid is injected exceeds the overburden pressure and produces a horizontal fracture within the subsurface earth formation.

A primary object of the present invention is to provide an economically feasible method for forming a fracture that interconnects a pair of wells within an earth formation which, at the reservoir conditions, is substantially impermeable.

A further object of the present invention is to provide a process of thermally expanding a portion of a subterranean earth formation in order to alter the ratio of vertical to horizontal compressive stresses within the formation. This is preferably accomplished by pumping a liquid into a fracture within the formation while heating the liquid and adjusting the properties of the liquid and the pressure at which it is injected as required to maintain a flow rate such that heat is distributed throughout a generally cylindrical zone having a diameter which is large relative to the diameter of the well.

Figure 2:
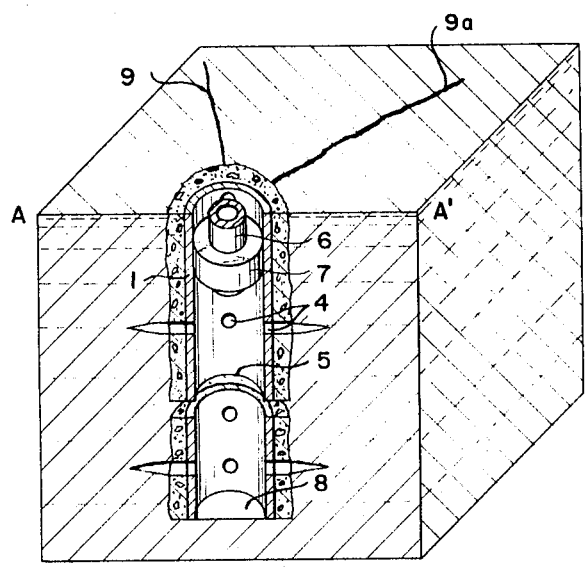

Other objects and advantages of the present invention will be apparent from the following description and drawing, wherein:

FIGURE 1 is a cross-sectional view showing a well and a surrounding earth formation which have been treated in accordance with the process of the present invention; and FIGURE 2 is an isometric view showing a portion of the same well and formation, taken along the line A, A' in FIGURE 1, in order to illustrate events which occur during the initial stages of the application of the present process.

FIGURES 1 and 2 show a well which is provided with equipment suitable for use in practicing a present invention. A string of casing 1 is installed to extend from a surface location into an earth formation 2 in which it is desired to create a horizontal fracture 3. The casing is provided with perforations 4 and circumferential notch or cut 5 which open the well into fluid communication with the earth formation 2. A tubing string 6 and a packer 7 provide a means of conveying fluid from a surface location to a location adjacent to earth formation 2. The upper end of the tubing string 6 is connected to a pump 12 and heating and liquid-handling units, not shown. These units can be conventional types of such equipment.

In practicing the present invention, the earth formation 2 is initially fractured by pumping liquid through tubing 6 to a selected region within casing 1. As shown in FIGURE 2, in this region the liquid is confined by the packer 7 and the borehole bottom 8 and is conveyed by the perforations 4 and notch 5 into contact with the earth formation 2. The pressure on the liquid is increased until the bottom hole liquid pressure exceeds the fracturing pressure and causes a fracture, such as fracture 9, to form within the earth formation. When the fracture forms, liquid flows out of the well at a relatively high rate. The liquid that enters the fracture extends the fracture and flows into the extended opening and into the walls of the fracture until an equilibrium is established between the rates and pressures of the inflows and outflows.

In such a fracturing step, substantially any of the conventional fracturing techniques and equipment can be utilized. However, although the injection of fracture propping materials is commonly employed in a fracturing operation, such a step is generally unnecessary in respect to the initial fracturing step of the present process.

The liquid is pumped into a fracture at a rate which is sufficient to transport heat from a surface location to the fracture. In treating a given well, the liquid which is being heated and injected has a given heat capacity and, in that well, a hot fluid loses heat at a certain rate while it is present in a conduit extending into the well. Thus, where a liquid is being heated at a surface location and pumped through tubing string 6 and into earth formation 2, unless the flow rate is sufficient in respect to the heat capacities of that liquid, and the heat losses in that conduit, the liquid will be cooled to the ambient earth formation temperatures by the time it reaches earth formation 2. In general, the flow rate at which a heated liquid is pumped into a subterranean earth formation should amount to at least about 0.1 barrel per minute for wells of from shallow to medium depths and should be higher for deeper wells.

While the liquid is pumped and heated to increasingly hotter temperatures, the pumping pressure is increased as required to maintain an adequate rate of flow. In addition, the rate at which the inflowing portions of the liquid are heated to temperatures that increase above the temperature of the earth formation 2 is correlated with the flow rate. The average rate of increase in the temperature to which the inflowing portions of the liquid are heated is correlated with the flow rate of the liquid in order to avoid an average rate of temperature increase that is too high relative to the average rate of flow. The increases in the temperature to which the inflowing liquid is heated can be incremental or continuous increases. The rate of increase that is suitable for a given situation can be calculated or determined from the properties of the liquid and the earth formation that is being treated. In general, the average rate of temperature rise above the subsurface earth formation temperature should be such that, at the average rate at which the heated liquid is being flowed into the fracture, the temperature gradient within the fracture along a line extending away from the well remains less than about 1° F. per foot. Such a correlation of the heating and flowing rates causes heat to be transferred to the fracture walls along radial distances which are significant, i.e. to distances which extend for at least five feet or more into the earth formation behind the wall of the borehole of the well.

During this operation, the liquid which is heated and injected can be any substantially noncompressible liquid. Water and aqueous solutions are particularly suitable. The heating and pumping operations can be accomplished by means of substantially any equipment and technique.

As liquid that is heated, in the manner described above, is flowed to a fracture such as fracture 9, the adjacent portions of each formation 2 become heated and thermally biased toward expansion. As this occurs, the fracture walls are pushed toward each other and the fracture begins to close. As the fracture closes, the injected liquid finds fewer openings that are permeable and a higher injection pressure is required, in order to maintain an adequate rate of flow. When the injection pressure exceeds the fracturing pressure of another portion of the earth formation, another fracture, such as fracture 9a, is formed. The heating and flowing of liquid into any new vertical fracture causes the above sequence of events to be repeated. The fractures form at whatever points are then the weakest points within the earth formation. Where the vertical stress within a subsurface earth formation exceeds both of the orthogonally directed horizontal stresses, two vertical fractures, such as the fractures 9 and 9a, are apt to be formed along directions that are substantially perpendicular to each other.

The heating and injecting of liquid heats a portion of the earth formation 2 which is roughly cylindrically shaped, as is illustrated in FIGURE 1, by the "thermally biased region" 10. Within this region the vertical stresses are relieved by a lifting of the overburden. The vertical expansion lifts the wellhead and surrounding earth to cause the "surface heave" 11. The overall effect is that the thermally-induced vertical stresses are relieved whereas the horizontal stresses remain unrelieved and, the vertical stress becomes less than the horizontal stress. The pressure required to form a fracture then exceeds the overburden pressure and the fracture that forms is a horizontal fracture, such as fracture 3. The formation of such a horizontal fracture is indicated by a peaking followed by a sharp reduction in the injection pressure and a tendency for the flow rate to be severely reduced wherever the injection pressure becomes nearly as low as the overburden pressure.

In a preferred procedure for insuring that the horizontal fracture will form at a rather precisely known depth, the casing is notched as illustrated by notch 5. The notching of a casing and/or adjacent formation involves known methods and equipment for serving the casing and surrounding cement. When this is done at a selected depth, the thermally biased region 10 tends to be weakest, in respect to the formation of a horizontal fracture, at the selected depth. At depths other than that of the notch, a vertical separation of layers of formation 2 would necessitate at least some shearing of the bonds between the earth formation and the casing and the surrounding cement and/or formation.

Where the horizontally-fractured earth formation is capable of remaining competent at the temperature at which fluid is to be injected into or produced from the fracture, the fracture is preferably mechanically propped. This can be accomplished by substantially any of the conventional procedures for depositing a propping material, such as sand grains, walnut shells, glass beads, etc., between the walls of the fracture. Such a mechanical propping is required to keep a horizontal fracture open when fluids are flowed through the fracture at a pressure less than the overburden pressure.

Where the subsurface earth formation is to be heated to a relatively high temperature, the correlated heating and flowing of liquid are preferably continued until that temperature is reached at the point the liquid enters the fracture. This may require that the heating and flowing be continued after a horizontal fracture has been formed.

The present invention provides a thermal back-flow production process which is uniquely advantageous for certain earth formations. This process is applicable to an earth formation that is impermeable at the reservoir temperature, contains a valuable component, and becomes permeable and competent at a temperature at which the valuable component is converted to mobile fluid. This process comprises the steps of (1) fracturing the reservoir formation, (2) heating a liquid and pumping it into the fracture while correlating the heating and pumping rates and pressure to form a horizontal fracture, as described above, employed in conjunction with the steps of (3) disposing a granular fracture-propping material within the fracture, (4) reducing the pressure within the borehole and producing fluid from the fracture, and (5) recovering thermally mobilized reservoir formation components from the produced fluid. The steps of pumping hot fluid into the fracture and then reducing the pressure within the borehole and producing fluid out of the fracture are preferably repeated, in succession, to recover additional portions of the reservoir formation component. In such repetitions, the hot fluid is preferably steam, in the form of dry or low quality steam.

EXAMPLE

A model of a subsurface earth formation was formed by consolidating a mass of polyethelene beads with silica gel within a cylindrical glass container 12 inches in diameter by 7½ inches deep. An overburden was simulated by piling loose sand on the silica gel. After solidifying the gel at room temperature it was cooled about 3° C. and kept at that temperature so that, due to the plastic beads having a greater coefficient of expansion and thus contraction than the surrounding glass and the weight of the overlying sand, the gelled mass of beads was compressively stressed most along the vertical direction and least along the horizontal directions. A well which opened into the gelled formation was modeled by a ¼ inch glass tube which was sealed to the base of the glass cylinder, extended 2 inches up into the formation and into communication with a ⅛ inch open hole having a length of ½ inch.

The formation was first fractured by injecting a dyed kerosene at the formation temperature. A vertical fracture formed at a fracturing pressure represented by 14.4 centimeters of mercury. The injection pressure then declined and stabilized at about 8 cms. Hg, with the injected fluid flowing in through the model well and out over the top of the container at a rate of 14½ cubic centimeters per minute.

While increasing the injection pressure as required in order to maintain the same rate of injection, the temperature of the kerosene being injected was increased at an average rate of about 10° per minute. When the injection temperature reached about 50° C., the injection pressure corresponded to 21.5 cms. Hg and a horizontal fracture was formed. The fact that the first fracture was vertical and was closed by the thermal expansion of the formation, whereas the second fracture was horizontal and remained open, was established by recovering portions of the synthetic formation and observing the locations of the dyed kerosene.

We claim as our invention:

1. A process for forming a horizontal fracture in a subsurface earth formation in which the fractures formed at the formation temperature are generally vertical fractures, which process comprises:

fracturing the earth formation at substantially the formation temperature, flowing liquid from a surface location into the fracture at a rate adequate for transporting heat from the surface location to the fracture, heating the inflowing liquid at the surface location while adjusting the rate at which the temperature of the inflowing liquid is raised above the earth formation temperature to a rate which is low relative to the liquid flow rate so that each portion of the liquid remains hotter than the earth formation until it has moved a significant distance away from the well, and continuing the flowing and temperature increasing of the liquid while increasing the pressure at which it is injected as required in order to maintain said adequate rate of flow until the pressure is increased above the overburden pressure and a fracture is formed at a pressure that exceeds the overburden pressure.

2. A process for horizontally fracturing a subsurface earth formation, which process comprises:

pumping liquid through a well and into a fracture within a subsurface earth formation, heating the inflowing liquid to increasingly hotter temperatures at a surface location and increasing the pumping pressure as required to pump the heated liquid into the fracture at a rate exceeding 0.1 barrel per minute, and continuing said heating and pressure increasing until said required pressure has exceeded the overburden pressure and formed a fracture at a pressure exceeding the overburden pressure.

3. The process of claim 2 wherein the rate of increasing the temperature of the inflowing liquid is limited to a rate that produces a gradient of less than 1° F. per foot in the liquid flowing away from the well.

4. The process of claim 2 wherein the heated liquid is a briney water which is softened as required to provide increasingly softer water that is non-scaling at the increasingly hotter temperature to which the liquid is heated.

5. A process for extracting a thermally mobilizable component from a substantially impermeable reservoir that becomes more permeable as said component is mobilized, which process comprises:

horizontally fracturing said reservoir by the process of claim 2, disposing pressure resistant grains within the fracture, injecting fluid into the fracture at a temperature sufficient to mobilize said thermally mobilizable component, reducing the pressure within the well and producing fluid from the fracture, and recovering portions of said thermally mobilizable component from the produced fluid.

6. A process for horizontally fracturing a subsurface earth formation, which process comprises:

pumping liquid through a well and into a fracture within said subsurface earth formation;

heating the inflowing liquid to increasingly hotter temperatures and increasing the pumping pressure as required to pump the heated liquid into the fracture at a rate exceeding 0.1 barrel per minute; and continuing said heating and pressure increasing until said required pressure has become at least substantially equal to the overburden pressure and formed another fracture at a pressure at least substantially equalling the overburden pressure.

7. The process of claim 6 in which the pumping and heating of inflow liquid is effected in a plurality of wells in a areally essential pattern of wells.

References Cited
UNITED STATES PATENTS

| | | | |
|---|---|---|---|
| 3,136,359 | 6/1964 | Graham | 166—40 X |
| 3,193,009 | 7/1965 | Wallace et al. | 166—40 X |
| 3,204,694 | 9/1965 | Johnson et al. | 166—40 X |
| 3,279,538 | 10/1966 | Doscher | 166—11 |
| 3,284,281 | 11/1966 | Thomas | 166—11 X |
| 3,330,353 | 7/1967 | Flohr | 166—40 |

DAVID H. BROWN, Primary Examiner

IAN A. CALVERT, Assistant Examiner

U.S. Cl. X.R.

166—304, 308